US007880140B2

(12) United States Patent
Guna et al.

(10) Patent No.: US 7,880,140 B2
(45) Date of Patent: Feb. 1, 2011

(54) MULTIPOLE MASS FILTER HAVING IMPROVED MASS RESOLUTION

(75) Inventors: Michael-Mircea Guna, Toronto (CA); James Hager, Mississauga (CA)

(73) Assignee: DH Technologies Development Pte. Ltd, Singapore (SG)

( * ) Notice: Subject to any disclaimer, the term of this patent is extended or adjusted under 35 U.S.C. 154(b) by 496 days.

(21) Appl. No.: 11/743,176

(22) Filed: May 2, 2007

(65) Prior Publication Data

US 2008/0272295 A1 Nov. 6, 2008

(51) Int. Cl.
*H01J 49/00* (2006.01)
*B01D 59/44* (2006.01)

(52) U.S. Cl. ........................ 250/292; 250/281; 250/282

(58) Field of Classification Search ................. 250/281, 250/282, 290, 292

See application file for complete search history.

(56) References Cited

U.S. PATENT DOCUMENTS

| | | | |
|---|---|---|---|
| 2,939,952 | A | 6/1960 | Paul et al. |
| 3,147,455 | A | 9/1964 | Wuerker et al. |
| 3,321,623 | A | 5/1967 | Brubaker et al. |
| 4,090,075 | A | 5/1978 | Brinkmann et al. |
| 4,234,791 | A | 11/1980 | Enke et al. |
| 4,531,056 | A | 7/1985 | Labowsky et al. |
| 5,089,703 | A | 2/1992 | Schoen et al. |
| 5,115,131 | A | 5/1992 | Jorgenson et al. |
| 5,227,629 | A | 7/1993 | Miseki |
| 5,464,975 | A | 11/1995 | Kirchner et al. |
| 5,942,752 | A | 8/1999 | Wang |
| 6,028,308 | A | 2/2000 | Hager |
| 6,111,250 | A | 8/2000 | Thomson et al. |
| 6,114,691 | A | 9/2000 | Cousins |
| 6,177,668 | B1 | 1/2001 | Hager |
| 6,184,522 | B1 | 2/2001 | Jolliffe |
| 6,194,717 | B1 | 2/2001 | Hager |
| 6,534,765 | B1 | 3/2003 | Robb et al. |
| 6,586,731 | B1 | 7/2003 | Jolliffe |
| 6,700,120 | B2 | 3/2004 | Hager |
| 6,703,607 | B2 | 3/2004 | Stott et al. |
| 6,841,774 | B1 | 1/2005 | Weiss |
| 6,897,438 | B2 | 5/2005 | Soudakov et al. |
| 6,936,224 | B2 | 8/2005 | Fichera et al. |
| 6,940,068 | B2 | 9/2005 | Burns et al. |
| 6,989,534 | B2 | 1/2006 | Schubert et al. |
| 7,015,466 | B2 | 3/2006 | Takáts et al. |

(Continued)

FOREIGN PATENT DOCUMENTS

| | | |
|---|---|---|
| JP | 62043562 | 2/1987 |

(Continued)

OTHER PUBLICATIONS

Ding et al., "Quadrupole Mass Filters with Added Octopole Fields," QMSII Aug. 19, 2003.

(Continued)

*Primary Examiner*—Jack I Berman
*Assistant Examiner*—Brooke Purinton

(57) ABSTRACT

A multipole mass filter having improved mass resolution. The multipole mass filer having a first electrode set coupled to at least a RF voltage source and a second electrode set interposed and parallel to the first electrode set. The second electrode set having a variable AC voltage coupled to two radially opposing electrodes of the second electrode set.

24 Claims, 4 Drawing Sheets

U.S. PATENT DOCUMENTS

| | | | |
|---|---|---|---|
| 7,019,290 | B2 | 3/2006 | Hager et al. |
| 7,041,967 | B2 | 5/2006 | Hager |
| 7,045,296 | B2 | 5/2006 | Parker et al. |
| 7,060,972 | B2 | 6/2006 | Hager |
| 7,064,322 | B2 | 6/2006 | Crawford et al. |
| 7,067,802 | B1 | 6/2006 | Kovtoun |
| 7,078,686 | B2 | 7/2006 | Roushall et al. |
| 7,079,580 | B2 | 7/2006 | Sakaguchi et al. |
| 7,081,620 | B2 | 7/2006 | Kato |
| 7,084,398 | B2 | 8/2006 | Loboda et al. |
| 7,098,452 | B2 | 8/2006 | Schneider et al. |
| 7,102,129 | B2 | 9/2006 | Schwartz |
| 7,105,812 | B2 | 9/2006 | Zhao et al. |
| 7,109,480 | B2 | 9/2006 | Vestal et al. |
| 7,112,784 | B2 | 9/2006 | Bateman et al. |
| 7,135,296 | B2 | 11/2006 | Baranov et al. |
| 7,145,133 | B2 | 12/2006 | Thomson |
| 2003/0189168 | A1 | 10/2003 | Londry et al. |
| 2004/0124353 | A1 | 7/2004 | Tanner et al. |
| 2005/0178963 | A1 * | 8/2005 | Londry et al. ............... 250/293 |
| 2005/0253064 | A1 * | 11/2005 | Loboda et al. .............. 250/282 |
| 2007/0084998 | A1 * | 4/2007 | Franzen et al. .............. 250/287 |
| 2008/0265155 | A1 * | 10/2008 | Kovtoun ..................... 250/292 |

FOREIGN PATENT DOCUMENTS

| | | |
|---|---|---|
| JP | 63318061 | 12/1988 |

OTHER PUBLICATIONS

Landais et al., "Varying the Radio Frequency: A New Scanning Mode for Quadrupole Analyzers," Rapid Communications in Mass Spectrometry, vol. 12, 302-306 (1998).

Wang et al., "A Qit-q-T of Mass Spectrometer for Multi-Dimensional MS/MS in High Throuput Proteomics," ASMS Conference (2006).

* cited by examiner

MULTIPOLE MASS FILTER HAVING IMPROVED MASS RESOLUTION

INTRODUCTION AND SUMMARY

Generally, quadrupole mass filters consist of four parallel conductive rods or elongated electrodes arranged such that their centers form the corners of a square and whose opposing poles are electrically connected. The voltage applied to these rods typically consists of a superposition of a static potential and a sinusoidal radio frequency (RF) potential. The motion of an ion in the x and y dimensions along these mass filters is described by the Mathieu equation whose solutions show that ions in a particular mass-to-charge ratio range can be transmitted along a z-axis. See, for example, U.S. Pat. No. 2,939,952 to Paul.

Traditionally, to improve resolution in a multipole mass filter, such as a quadrupole, the field along the z-axis is lengthened by lengthening the conductive rods. However, by increasing the length of the conductive rods, the associated costs of manufacturing is increased due to increased size of the mass filter and the corresponding size of the vacuum chambers that are necessary to house the mass filter. Moreover, the increased physical size of conventional mass filters further requires larger and/or additional vacuum pumps to maintain the necessary low pressures environment therein. Still further, the corresponding costs associated with manufacturing longer conductive rods to the required tolerances increases. Finally, by lengthening the conductive rods, the overall size of the associated mass spectrometer increases, which can limit installation in many laboratory settings.

Accordingly, applicant's teachings provide methods and apparatus for improving mass resolution of a mass filter without unduly increasing the overall size and cost of the system. To accomplish this, in some embodiments, a mass filter is provided having a first group of elongated electrodes arranged equidistant around a central axis, and a second group of electrodes arranged parallel to and in an alternating pattern with the elongated electrodes of the first group. A RF voltage can be applied to the first group of electrodes and a variable AC voltage can be applied to two radially opposing electrodes of the second group. In this way, the mass resolution and sensitivity of a specified mass range of the mass filter can be optimized, as will be discussed herein. Through this optimization, shorter electrodes can now be used compared to those of conventional mass filters. Still further, through this optimization, electrodes that are known to be out of tolerance for use in a conventional mass filter may now be used in a mass filter according to applicant's teachings as a result of the increased controllability provided thereby, which reduces manufacturing costs and waste.

Further areas of applicability will become apparent from the description provided herein. It should be understood that the description and specific examples are intended for purposes of illustration only and are not intended to limit the scope of the applicants' teachings.

DRAWINGS

The skilled person in the art will understand that the drawings, described below, are for illustration purposes only. The drawings are not intended to limit the scope of the applicants' teachings in any way.

DETAILED DESCRIPTION

Figure 1:
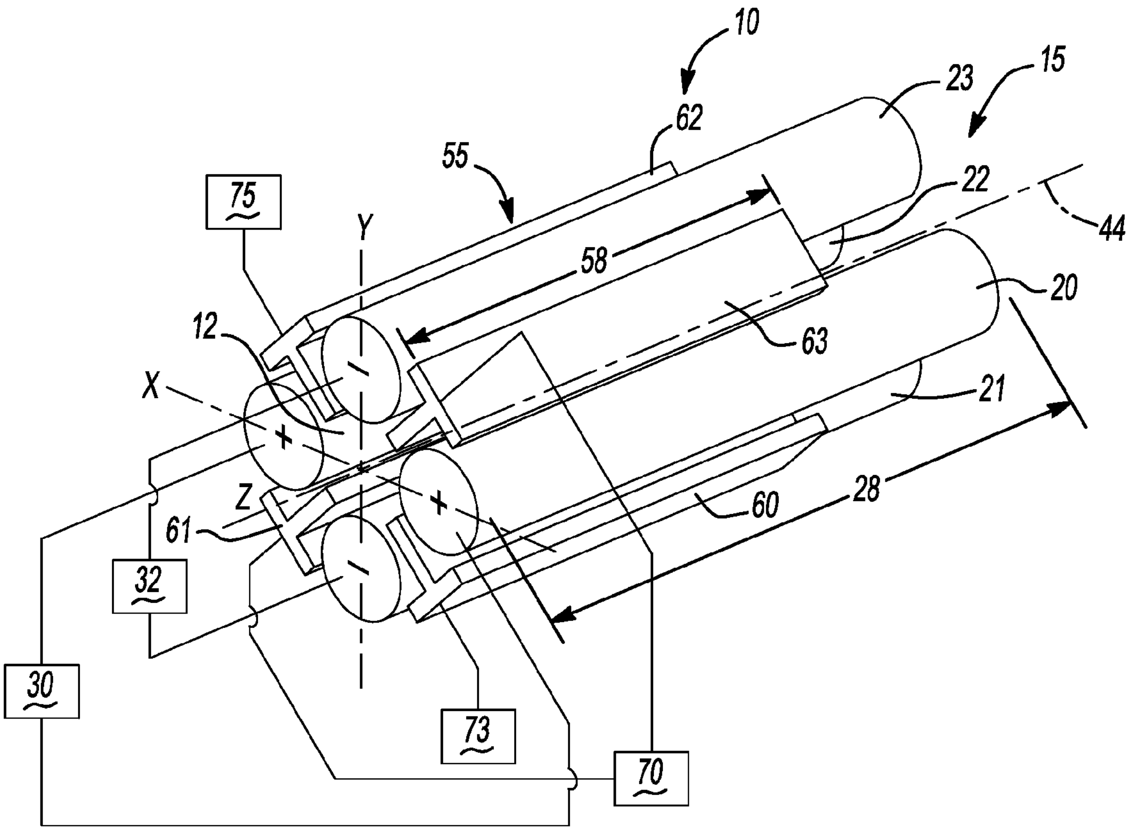
FIG. 1 is perspective view illustrating a multipole mass filter according to some embodiments of the applicants' teachings.

The following description is merely exemplary in nature and is not intended to limit the applicants' teachings, applications, or uses. Although the applicants' teachings will be discussed in some embodiments as relating to mass spectroscopy and mass filters, such discussion should not be regarded as limiting the applicants' teachings to only such applications. Furthermore, it should be appreciated that the applicants' teachings may be used in conjunction with a variety of multipole instruments, including, for example, multipoles having quadrupolar, hexapolar, and octapolar or higher fields. It should be understood that throughout the drawings, corresponding reference numerals indicate like or corresponding parts and features.

All references cited herein are hereby incorporated by reference in their entirety, for all purposes. The citation of references herein does not constitute an admission that those references are prior art or have any relevance to the patentability of the applicants' teachings disclosed herein. In the event that one or more of the incorporated references, literature, and similar materials differs from or contradicts this application, including, but not limited to, defined terms, term usage, described techniques, or the like, this application controls.

Apparatus

Figure 2:
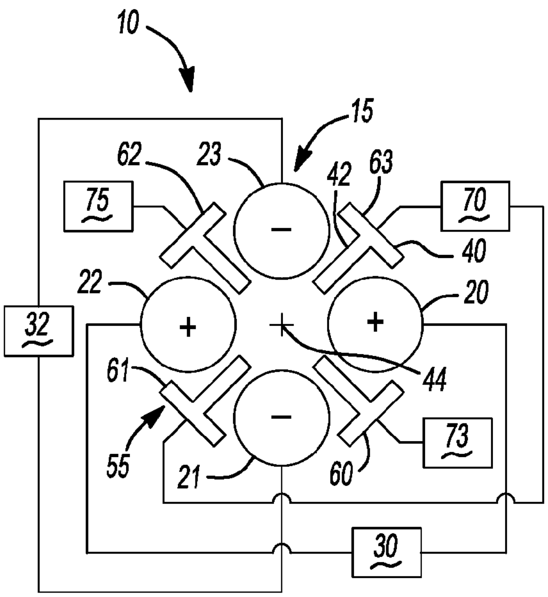
FIG. 2 is an end view of the multipole mass filter of FIG. 1 according to some embodiments of the applicants' teachings.

With reference to FIGS. 1 and 2, an example of a mass filter 10, according to the applicants' teachings, is illustrated which can be a multipole mass filter having a first rod set 15 and a second rod set 55. In some embodiments, first rod set 15 can comprise four primary rods 20, 21, 22, 23 (rods may be referred to by one skilled in the art as electrodes or poles) surrounding at an equidistant to and extending parallel to a central axis 44. Similarly, in some embodiments, second rod set 55 can comprise four complementary rods 60, 61, 62, 63 surrounding at an equidistant to and extending parallel to central axis 44.

With continued reference to FIGS. 1 and 2, each of primary rods 20, 21, 22, 23 can comprise a substantially circular cross-section having a length 28. In some embodiments, each of primary rods 20, 21, 22, 23 can be substantially equivalent in size and shape to each other. Primary rods 20, 21, 22, 23 are electrically conductive and, thus, can be made of any conductive material such as metal or alloy.

In some embodiments, each of complementary rods 60, 61, 62, 63 can comprise any one of a variety of cross-sectional shapes having a length 58. For example, in some embodiments, the cross-sectional shape of complementary rods 60, 61, 62, 63 can be circular, oval, teardrop, triangular, or any other shape that is conducive to packaging, mounting, and/or tailoring of a characteristic of field 12. In some embodiments, the cross-sectional shape of complementary rods 60, 61, 62, 63 can be substantially T-shaped, as illustrated in the accompanying figures. The T-shape cross-section of the applicants' teachings provides a number of advantages. In particular, the T-shape, having a top orthogonal portion 40 and an extending leg portion 42 (FIG. 2), can be conveniently disposed between adjacent primary rods 20, 21, 22, 23 such that extending leg portion 42 extends therebetween and penetrates to a point immediately adjacent field 12 while still providing top orthogonal portion 40 for connecting to any exterior support housing. Finally, the T-shape of complementary rods 60, 61, 62, 63, in conjunction with primary rods 20, 21, 22, 23, minimizes an overall packaging size of mass filter 10, thus minimizing manufacturing costs and minimizing fringing effects of field 12.

As will be discussed in detail, complementary rods 60, 61, 62, 63 can be aligned parallel to primary rods 20, 21, 22, 23. In some embodiments, complementary rods 60, 61, 62, 63 can be placed in an alternating or interposed pattern between primary rods 20, 21, 22, 23. Complementary rods 60, 61, 62, 63 are electrically conductive and, thus, can be made of any conductive material such as for example metal, alloy, or doped fiber. In some embodiments, an insulator (not shown) can be disposed between adjacent primary rods, 20, 21, 22, 23, between adjacent complementary rods 60, 61, 62, 63, and/or between individual primary rods and individual complementary rods.

The rods of the applicants' teachings can be electrically coupled to one or more voltage sources such that an electric potential can be applied to a single rod or a combination of rods. To this end, each voltage source can comprise one or more power supplies that are each electrically coupled to a corresponding one or group of rods. For example, in some embodiments as illustrated in FIG. 2, a first power supply 30 can be electrically coupled to radially opposing primary rods 20, 22 so as to apply an identical electric potential thereto. Similarly, in some embodiments, a second power supply 32 can be electrically coupled to radially opposing primary rods 21, 23. As illustrated in FIG. 2, first power supply 30 can apply an electric potential of $V(t)=+(U-W \cos \Omega t)$ and second power supply 32 can apply an electric potential $V(t)=-(U-W \cos \Omega t)$, wherein U is DC voltage, W is radio frequency (RF) amplitude, Ω is angular RF frequency, and t is time. Consequently, in some embodiments, first power supply 30 and/or second power supply 32 can generate radio frequency (RF) as a product of AC voltage.

Similarly, in some embodiments, a second voltage source can comprise a third power supply 73, a fourth power supply 75, and a fifth power supply 70. As illustrated in FIG. 2, third power supply 73 can be electrically coupled directly to complementary rod 60 to provide discrete control thereof. Likewise, fourth power supply 75 can be electrically coupled directly to complementary rod 62 to provide discrete control thereof. In some embodiments, third power supply 73 can provide an electric potential of $V(t)=A_1+(B_1 \cos \Omega t)$ and fourth power supply 75 can provide an electric potential of $V(t)=A_2-(B_2 \cos \Omega t)$, wherein A is a DC voltage, $(B_2 \cos \Omega t)$ is an AC voltage where B is an amplitude, cos Ω is a frequency, and t is time. In some embodiments, B can be varied and cos Ωt can be held constant to provide a variable AC voltage having constant frequency and a varying amplitude to at least in part provide improved mass resolution of mass filter 10.

It should be appreciated that there exists a number of modifications to the electric potential output of third power supply 73 and fourth power supply 75 that can be used to further improve the mass resolution of mass filter 10. For example, in some embodiments, the variable AC voltage applied to complementary rod 60 can be out of phase with the variable AC voltage applied to complementary rod 62. In some embodiments, $B_2$ can be greater than $B_1$. In some embodiments, a ratio of $B_2/B_1$ can be a whole number such as, for example, 2, 3, 4, 5, or 6. In some embodiments, the frequency of the AC voltage applied to second rod set 55 can be different than a frequency of the RF voltage applied to first rod set 15. Finally, in some embodiments, the variable AC voltage can be provided to only one of the radially opposing complementary rods 60, 62.

In some embodiments, fifth power supply 70 can be electrically coupled to remaining complementary rods 61, 63 to provide combined control thereof. It should be appreciated that in some embodiments, first power supply 30, second power supply 32, third power supply 73, fourth power supply 75, and fifth power supply 70 can be coupled to a single voltage source. In some embodiments, third power supply 73 and fourth power supply 75 can provide the variable AC voltage while fifth power supply 70 provides a constant DC voltage or no voltage. Additionally, it should be appreciated that each of the primary rods and complementary rods can be coupled to individual and discrete power supplies for maximum controllability and configurability.

Referring again to FIG. 1, in some embodiments, the length of complementary rods 60, 61, 62, 63 can be reduced relative to the length of primary rods 20, 21, 22, 23 yet the overall resolution of mass filter 10 can be maintained and/or improved by the varying of AC voltage supplied to complementary rods 60, 62. Therefore, length 58 of complementary rods 60, 61, 62, 63 can be significantly less than length 28 of primary rods 20, 21, 22, 23 In a non-limiting example, primary rods 20, 21, 22, 23 of first rod set 15 can be about 20 cm in length 28 and complementary rods 60, 61, 62, 63 of second rod set 55 can be about 5 cm in length 58.

In some embodiments, the AC voltage amplitude (B) can be systematically varied to optimize the mass resolution and sensitivity of a specified mass range of the mass filter 10. Applicants' teachings can provide a mass filter 10 which achieves reliable results but with shorter primary rods 20, 21, 22, 23 than used in conventional mass filters. In a non-limiting example, mass filter 10 can include primary rods 20, 21, 22, 23 having a length 28 of about 5 cm and complementary rods 60, 61, 62, 63 having a length 58 of about 5 cm. Mass filter 10 described in the non-limiting example can have a mass resolution that is greater than or equivalent to a conventional multipole mass filter that includes electrodes having a length of about 20 cm.

In some embodiments, primary rods 20, 21, 22, 23 that are known to be out of tolerance for use in a conventional mass filter may now be used in mass filter 10 and provide acceptable results. This is due to increased controllability and resolution of mass filter 10 provided by the varying of AC voltage supplied to complementary rods 60, 62. By applying applicants' teachings, value may be retained in otherwise unusable rods.

Figure 3:
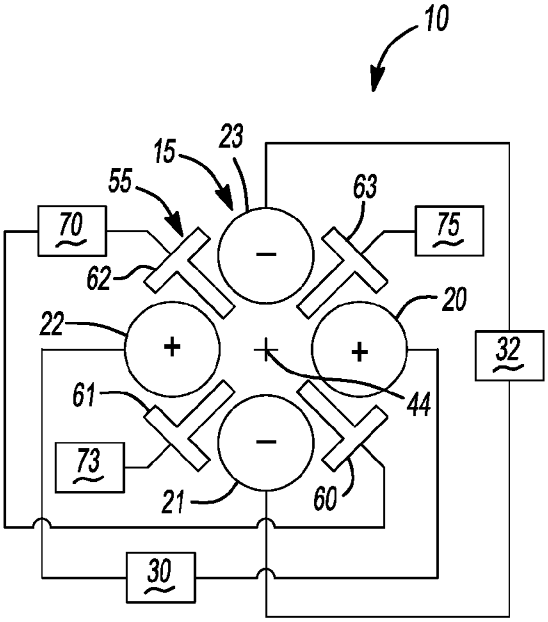
FIG. 3 is an end view illustrating a first alternate configuration of a multipole mass filter according to some embodiments of the applicants' teachings.

With reference to FIG. 3, it should be appreciated that mass filter 10 can define any one of a variety of configurations such as the mirror image illustrated therein. In such arrangement, fifth power supply 70 can be electrically coupled to complementary rods 60, 62, rather than complementary rods 61, 63. Likewise third power supply 73 can be electrically coupled directly to complementary rod 61 to provide discrete control thereof, rather than complementary rod 60. Likewise, fourth power supply 75 can be electrically coupled directly to complementary rod 63 to provide discrete control thereof, rather than complementary rod 62.

It will be appreciated to one skilled in the art that other equivalent configurations exist by selecting different combinations of radially opposing complementary rods that are coupled to third power supply 73 and fourth power supply 75. For example, complementary rod 62 can be coupled to third power supply 73, complementary rod 60 can be coupled to fourth power supply 75, and the remaining complementary rods 61, 63 can be coupled to fifth power supply 70. Similarly, complementary rod 63 can be coupled to third power supply 73, complementary rod 61 can be coupled to fourth power supply 75, and the remaining complementary rods 60, 62 can be coupled to fifth power supply 70.

Figure 4:
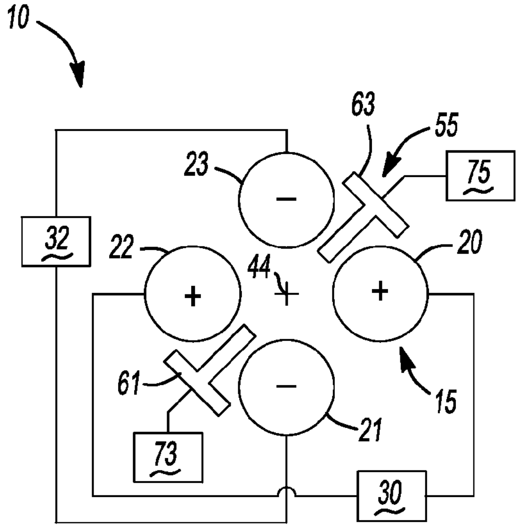
FIG. 4 is an end view illustrating a second alternate configuration of a multipole mass filter according to some embodiments of the applicants' teachings.
Figure 5:
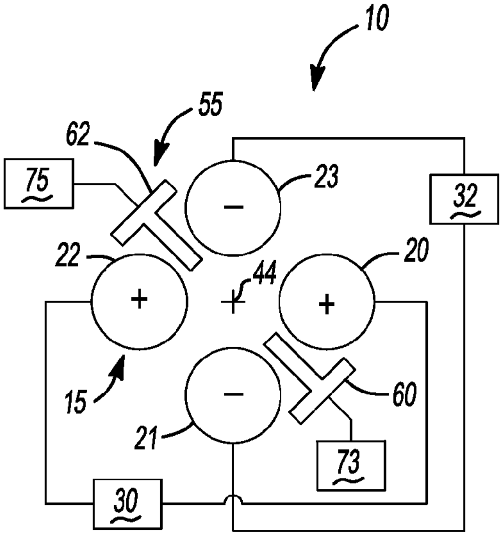
FIG. 5 is an end view illustrating a third alternate configuration of a multipole mass filter according to some embodiments of the applicants' teachings.

With reference to FIGS. 4 and 5, an example of mass filter 10 according to the applicants' teachings is illustrated, which comprises a second rod set 55 having only a pair of radially opposing complementary rods 61, 63. In FIG. 4, first rod set 15 is identical to first rod set 15 described in connection with FIGS. 1 and 2 and second rod set 55 comprises complementary rod 61 coupled to third power supply 73 and complementary rod 63 coupled to fourth power supply 75. This present arrangement can provide a simplified construction for applications that do not require four individual complementary rods.

With reference to FIG. 5, first rod set 15 is again identical to first rod set 15 described in connection with FIGS. 1 and 2 and second rod set 55 comprises complementary rod 60 coupled to third power supply 73 and complementary rod 62 coupled to fourth power supply 75. It should be appreciated to one skilled in the art that other equivalent configurations, which are not illustrated, can be used, which define similar configurations to those described herein.

Systems

Figure 6:
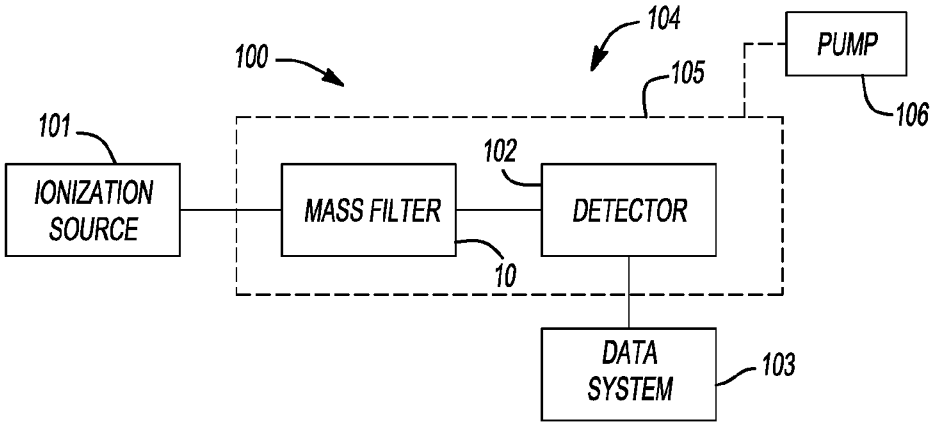
FIG. 6 is a block diagram illustrating a non-limiting example of a mass spectrometer according to some embodiments of the applicants' teachings.

Referring to FIG. 6, a mass spectrometer system 100 is illustrated in accordance with the applicants' teachings. In some embodiments, mass spectrometer system 100 can comprise an ion source 101; mass filter 10, 16, 18; and a detector system 102. In some embodiments, a data system 103 can be operably coupled to detector system 102 to receive and/or analyze data received from detector system 102 as will be discussed herein.

Generally, during analysis, a sample can be introduced into ion source 101, which ionizes the molecules contained in the sample thereby creating ions. These ions can be injected into mass filter 10 to separate the ions accordingly to mass-to-charge ratio, as described herein. The separated ions are detected by detector system 102 and this signal can be sent to a data system 103 where the detected mass-to-charge ratio can be collected along with the relative abundance of corresponding ions for later presentation as a mass spectrum and/or data analysis.

It should be understood that the method of sample introduction into ion source 101 depends on the ionization method being used as well as the type and complexity of the sample be analyzed. In some embodiments, the sample can be inserted directly into ion source 101 without any preprocessing as a whole. In some embodiments, however, the sample can undergo a method of chromatography separating the sample into its constituent components prior to insertion into ion source 101. It is anticipated that when using a method of chromatography for sample introduction, such methods may involve mass spectrometer system 100 being coupled directly to a high pressure liquid chromatography (HPLC), a gas chromatography (GC), or a capillary electrophoresis (CE) separation column via the ionization source. In this regard, the sample is separated into a series of constituent components by the method of chromatography and each of the series of constituent components can enter mass spectrometer system 100 sequentially for analysis thereof.

In some embodiments, ion source 101 can be a source operable for one of Atmospheric Pressure Chemical Ionization (APCI), Chemical Ionization (CI), Electron Impact Ionization (EI), Atmospheric Pressure Photoionization (APPI), Electrospray Ionization (ESI), Fast Atom Bombardment (FAB), Field Desorption/Field Ionization (FD/FI), Matrix Assisted Laser Desorption Ionization (MALDI), Thermospray Ionization (TSP), Nanospray Ionization, and the like. In some embodiments, ion source 101 can be a plasma, such as, for example, an inductively couple plasma (ICP), a microwave plasma, or a direct current plasma (DCP); a glow discharge source; an arc source; a spark source; or any other atomic emission device that can create ions. In some embodiments, ion source 101 can comprise a gas curtain, one or more skimmer cones, an orifice, a nebulizer, a sweeping gas, an ionization gas, a corona discharge device, or a vacuum pump (as described herein). In some embodiments, ion source 101 can operate at atmospheric conditions, low-pressure conditions, or may be interchangeable between atmospheric and low-pressure conditions. In some embodiments, ion source 101 comprises at least one ion guide or lens. In some embodiments, ion source 101 comprises a laser source. In some embodiments, ion source 101 can be operable for more than one type of ionization method, such as for example operable for ESI and also operable for MALDI and/or APCI.

In some embodiments, ion source 101, being operable for ESI, can be used for analysis of polar molecules ranging from less than 100 Da to more than 1,000,000 Da in molecular mass. In some embodiments, the sample is dissolved in a polar, volatile solvent and pumped through a stainless steel capillary tube (typically from about 75 to about 150 micrometers i.d.) at a flow rate of between about 1 μL/min and about 1 mL/min. A voltage of about 3 kV to about 4 kV is applied to the tip of the capillary tube, which is positioned within ion source 101 of mass spectrometer system 100. Due to the strong electric field generated, the sample emerging from the tip of the capillary tube is dispersed into an aerosol of highly charged droplets, which is directed by a co-axially introduced nebulizing gas (also known as a drying gas or a sweeping gas) flowing around the outside of the capillary tube. This gas, typically nitrogen or an inert gas, can help to direct the aerosol emerging from the tip of the capillary tube toward mass filter 10. The charged droplets diminish in size by solvent evaporation, assisted by a warm flow of the nebulizing gas. Eventually, charged sample ions, free from solvent, are released from the droplets, and pass through a skimmer cone or orifice into an intermediate vacuum region, and eventually through a small aperture into mass filter 10 of mass spectrometer system 100. For discussion relating to the ESI methodology, see, for example, U.S. Pat. No. 4,531,056 to Labowsky et al., U.S. Pat. No. 4,542,293 to Fenn et al., U.S. Pat. No. 5,130,538 to Fenn et al., U.S. Pat. No. 6,586,731 to Jolliffe, and U.S. Pat. No. 7,098,452 to Schneider. In addition, it has been shown that ESI with reduced flow rates, such as, for example, nanospray, can be achieved through the use of microfluidics as shown in for example U.S. Pat. No. 5,115,131 to Jorgenson et al. and U.S. Pat. No. 7,105,812 to Zhao et al.

In some embodiments, ion source 101, being operable for MADLI, can be used in the analysis of biomolecules, such as, for example, proteins, peptides, and sugars, and is based on the bombardment of sample with a laser light to bring about sample ionization. In some embodiments, a sample is pre-mixed with a light absorbing compound known as the matrix and applied to a sample target, and is then allowed to dry prior to insertion into the low pressure of mass spectrometer system 100. A laser can provide energy to the sample/matrix surface. The matrix transforms the laser energy into excitation energy for the sample, which leads to sputtering of the sample releasing matrix ions from the sample/matrix surface. The matrix containing the ions is volatile and thus evaporates, such that the remaining ions enter mass filter 10. Since MADLI is a soft ionization methodology, energy transfer is efficient but the sample is spared excessive direct energy that may otherwise cause decomposition. For discussion relating to the MALDI methodology, see, for example, JP Patent No. 62043562 to Tanaka, and U.S. Pat. No. 4,214,159 to Hillenkamp et al., U.S. Pat. No. 5,777,324 to Hillenkamp, U.S. Pat. No. 6,995,363 to Donegan et al., and U.S. Pat. No. 7,109,480 to Vestal et al.

In some embodiments, mass spectrometer system 100 can comprises a vacuum system 104 surrounding any combination of ion source 101; mass filter 10 detector system 102; and data system 103 to minimize scattering loss with background gas. Vacuum system 104 can comprise a vacuum chamber 105 and one or more vacuum pumps 106 to evacuate vacuum chamber 105 to create a low pressure therein. In some embodiments, the pressure within vacuum chamber 105 is less than $5\times10^{-4}$ torr and can be less than $5\times10^{-5}$ torr. More generally, in some embodiments, the pressure within vacuum chamber 105 can be in the range of about $5\times10^{-4}$ torr to about $1\times10^{-6}$ torr. Lower pressures can be used, but the reduction in scattering losses below $1\times10^{-6}$ torr is usually negligible for most applications. Vacuum pumps 106 can comprise any one of a number of pump types, such as, for example, oil diffusion pumps, turbomolecular pumps, and cryogenic pumps, and can be used individually or in tandem.

Still referring to FIG. 6, in some embodiments, detector system 102 monitors and records the charge induced or ion current produced when passage or impact of an ion is detected within detector system 102 to output data. This data can be sent to data system 103 for later presentation as a mass spectrum and/or data analysis. Detector system 102 can be a photomultiplier, a Faraday cup, an electron multiplier, a microchannel plate, or the like.

Figure 7:
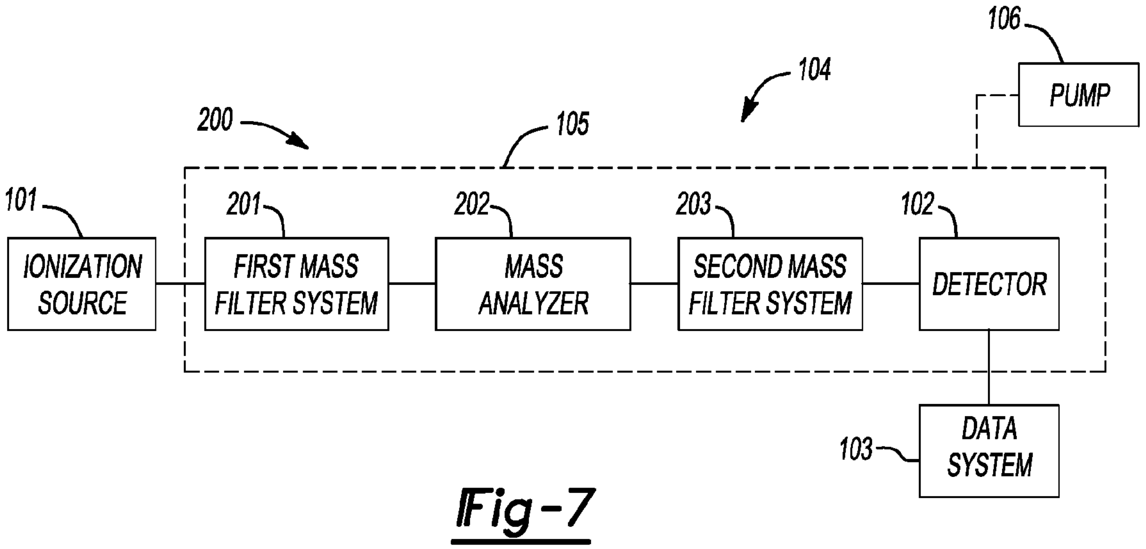
FIG. 7 is a block diagram illustrating a non-limiting example of a tandem mass spectrometer according to some embodiments of the applicants' teachings.

Referring to FIG. 7, a tandem mass spectrometer system 200 is illustrated in accordance with the applicants' teachings. Tandem mass spectrometer system 200 can comprise more than one mass filter for use in structural and sequencing studies. In some embodiments, tandem mass spectrometer system 200 can comprise ion source 101, a first mass filter system 201, a mass analyzer 202, a second mass filter system 203, detector system 102, and data system 103.

In some embodiments, first mass filter system 201 and second mass filter system 203 can be substantially equivalent. In some embodiments, first mass filter system 201 and second mass filter system 203 can be mass filter 10.

In operation, first mass filter system 201 can transmit a selected ion and accelerate the selected ion toward mass analyzer 202. In some embodiments, mass analyzer 202 is a collision cell to permit the selected ion to be fragmented by collision induced disassociation (CID). In some embodiments, the fragments of the selected ion can then be accelerated out of mass analyzer 202 so as to enter second mass filter system 203. Second mass filter system 203 can scan a predetermined mass range, thereby separating the fragments of the selected ion and outputting the fragments to detector system 102. Detector system 102 can monitor and record the charge induced or ion current produced when passage or impact of the fragments of the selected ion is detected within detector system 102 to output data. This data can be sent to data system 103 for later presentation as a mass spectrum and/or data analysis, or further provide structural information or identity of the original sample.

It should be appreciated that tandem mass spectrometer system 200 can contain variations tailored to a particular application. For example, in some embodiments, second mass filter system 203 can be a time of flight mass spectrometer (TOF) such as described in, for example, U.S. Pat. Nos. 6,285,027 and 6,507,019 to Chernushevich et al. In some embodiments, second mass filter system 203 can be a magnetic sector mass spectrometer, an ion trap mass spectrometer, a Fourier transform ion cyclotron resonance mass spectrometer, or any other type of mass spectrometer. In some embodiments, second mass filter system 203 can be two or more mass analyzers or mass filters in series. In some embodiments, an ion can be trapped in second mass filter system 203 and can be exposed to multiple MS steps resulting in $MS^n$ analysis. See, for example, commonly-assigned U.S. Pat. No. 6,992,285 to Cousins et al. and U.S. Pat. No. 7,069,972 to Hager.

Methods

In connection with the following discussion relating to methods of operation of applicants' teachings, the equations described above in connection with the primary rods and the complementary rods are reiterated below for reference:

first power supply 30: $V(t)=+(U-W\cos\Omega t)$;

second power supply 32: $V(t)=-(U-W\cos\Omega t)$;

third power supply 73: $V(t)=A_1+(B_1\cos\Omega t)$;

fourth power supply 75: $V(t)=A_2-(B_2\cos\Omega t)$; and fifth power supply 70: constant DC voltage or no voltage.

First power supply 30 and second power supply 32 are each electrically coupled to individual rods of first rod set 15 so as to apply electric potentials thereto. Similarly, third power supply 73 can be electrically coupled directly to a first rod of second rod set 55 to provide discrete control thereof. Likewise, fourth power supply 75 can be electrically coupled directly to a second radially opposing rod of second rod set 55 to provide discrete control thereof. Finally, fifth power supply 70 can be electrically coupled to the remaining rods of second rod set 55.

In some embodiments, mass filter 10 can be tuned to permit the passage of ions of a predetermined mass-to-charge ratio in response to a particular angular RF frequency (Ω) and the ratio of the RF amplitude (W) to the DC voltage magnitude (U) supplied to mass filter 10. Furthermore, in some embodiments, mass filter 10 can be scanned over a mass range such that by holding DC voltages (U) constant and sweeping the angular RF frequency (Ω) for a period of time (t), or by holding angular RF frequency (Ω) constant and sweeping DC voltage (U) for a period of time (t) while maintaining the ratio of the RF amplitude (W) to the DC voltage magnitude (U) constant, mass filter 10 can permit ions of regularly increasing (or decreasing) mass-to-charge ratio to pass therethrough in succession. Still further, in some embodiments, the AC voltage amplitude (B) can be systematically varied to optimize the mass resolution and sensitivity of a specified mass range of mass filter 10.

In some embodiments, an additional DC voltage (i.e. offset) can be applied to first rod set 15 and/or second rod set 55. In some embodiments, by applying the applicants' teachings described herein, it may be easier to tune mass filter 10 as compared to traditional resolution offset tuning used on traditional multipole mass filter.

In some embodiments, a method for correcting variations in mass filter 10 can comprise introducing a set of ions into mass filter 10 and outputting a resultant ion. The method can further comprise comparing the resultant ion to an ion of interest to determine a control factor, and actuating the second voltage source in response to the control factor to apply a variable AC voltage to second rod set 55 such that a subsequent resultant ion is equivalent to the ion of interest.

In some embodiments, a plurality of primary rods that are known to be out of tolerance for use in a conventional mass filter can be used in mass filter 10. By employing the principles of applicants' teachings, the ill-effects of such out of tolerance primary rods can be overcome through the improved controllability of mass filter 10 thereby retaining value in otherwise unusable rods.

EXAMPLES

Aspects of the applicants' teachings may be further understood in light of the following example, which should not be construed as limiting the scope of the applicants' teachings in any way.

Figure 8A:
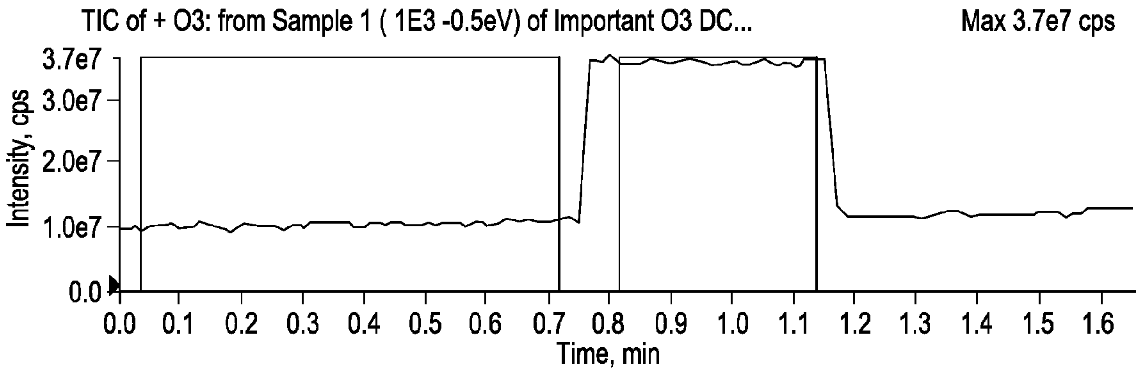
FIGS. 8A-8C are non-limiting examples of mass spectrum data according to some embodiments of the applicants' teachings.
Figure 8B:
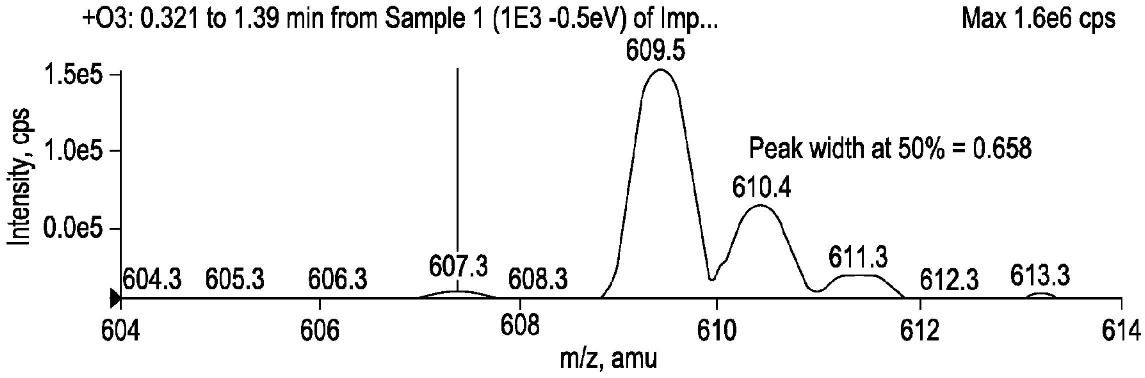
Figure 8C:
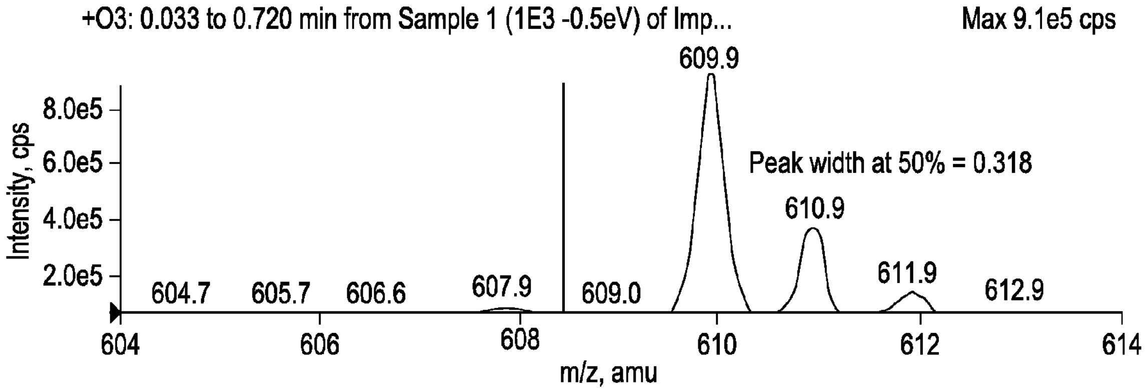

As illustrated in FIGS. 8A-8C, a graph depicting a total ion count over time (FIG. 8A), a mass spectrum of a reserpine ion at 609 mass-to-charge ratio using a conventional mass filter having only a set of primary rods with no variable AC voltage control (FIG. 8B), and a mass spectrum of a reserpine ion at 609 mass-to-charge ratio using mass filter 10 having first rod set 15 and second rod set 55 as described herein (FIG. 8C) is provided.

With particular reference to FIG. 8B, using the conventional mass filter, voltages and an offset are applied to its set of conventional primary rods. The RF frequency applied to primary rods is 1 MHz. The resulting peak width at 50% is 0.658 atomic mass units (amu).

With particular reference to FIG. 8C, using mass filter 10, same voltages and offset from FIG. 8B are applied to first rod set 15 and a variable AC voltage is applied to second rod set 55. The ratio between the AC voltage amplitudes ($B_1$, $B_2$) applied to a pair of radially opposing complementary rods is $B_2/B_1=3$. The DC voltage applied to all of the complementary rods is constant and equal to the offset applied to first rod set 15. The RF frequency applied to first rod set 15 is 1 MHz and the AC voltage frequency applied to second rod set 55 is 263 KHz. The resulting peak width at 50% is 0.318 amu. Accordingly, from this data, it can be seen that the mass resolution achieved by using mass filter 10 is more than double that achieved using conventional mass filters.

Some embodiments and the examples described herein are exemplary and not intended to be limiting in describing the full scope of compositions and methods of the applicants' teachings. Equivalent changes, modifications, and variations of some embodiments, materials, compositions, and methods can be made within the scope of the applicants' teachings, with substantially similar results.

The invention claimed is:

1. A multipole mass filter comprising:

a first rod set having a plurality of conductive rods;

a second rod set having a plurality of conductive rods being interposed and aligned in parallel with said first rod set in an alternating pattern, said first rod set and said second rod set together defining an input end for receiving ions and an output end;

a first voltage system electrically coupled to said first rod set, said first voltage system applying a voltage in response to an angular RF frequency and a ratio of an RF amplitude and a DC voltage magnitude to said first rod set; and a second voltage system electrically coupled to said second rod set, said second voltage system applying a variable AC voltage to a radially opposing pair of said plurality of conductive rods of said second rod set.

2. The multipole mass filter according to claim 1, wherein each of said plurality of conductive rods of said first rod set is generally circular in cross-section.

3. The multipole mass filter according to claim 1, wherein each of said plurality of conductive rods of said second rod set is generally T-shaped in cross-section.

4. The multipole mass filter according to claim 1 further comprising said second voltage system applying a constant voltage to a remainder of said plurality of conductive rods of said second rod set.

5. The multipole mass filter according to claim 1, wherein said voltage of said first voltage system provides a means for permitting ions of predetermined mass to pass from said input end through said output end.

6. The multipole mass filter according to claim 1, wherein said AC voltage provides a means for increasing a resolution of the mass filter.

7. The multipole mass filter according to claim 1, wherein said first rod set comprises four conductive rods and said second rod set comprises four conductive rods.

8. The multipole mass filter according to claim 1, wherein said plurality of conductive rods of said first rod set are spaced equidistant from a central axis.

9. The multipole mass filter according to claim 1, wherein said plurality of conductive rods of said second rod set are spaced equidistant from a central axis.

10. A mass spectrometer system comprising:

an ion source generating ions in a generally atmospheric pressure-region;

a vacuum chamber;

a first mass filter disposed in said vacuum chamber, said first mass filter comprising a first rod set having a plurality of conductive rods and a second rod set having a plurality of conductive rods interposed, aligned in parallel, and radially opposed with said first rod set, said first rod set and second rod set together defining an input end receiving said ions and an output end passing at least one of said ions, said first mass filter further having a first voltage source electrically connected to each of said plurality of conductive rods of said first rod set, said first voltage system applying a voltage in response to an angular RF frequency and a ratio of an RF amplitude and a DC voltage magnitude to said first rod set, said first mass filter further having a second voltage source electrically connected to said each of said plurality of conductive rods of said second rod set, said second voltage source applying an AC voltage to said second rod set such that a variable AC voltage is applied to two radially opposing conductive rods of said second rod set; and a detector detecting at least one ion.

11. The mass spectrometer system according to claim 10 further comprising:

a collision cell disposed in said vacuum chamber, said collision cell inducing disassociation of said at least one of said ions from said first mass filter, said collision cell having an input connected to said output end of said mass filter and an output end for ejecting fragmented ions therefrom; and a second mass filter disposed in said vacuum chamber, said second mass filter comprising a third rod set having a plurality of conductive rods and a fourth rod set having a plurality of conductive rods interposed, aligned in parallel, and radially opposed with said third rod set, said third rod set and fourth rod set together defining an input end receiving said fragmented ions and an output end passing at least one ion, said second mass filter further having a third voltage source electrically connected to each of said plurality of conductive rods of said third rod set, said third voltage source applying a voltage in response to an angular RF frequency and a ratio of an RF amplitude and a DC voltage magnitude to said third rod set, said second mass filter further having a fourth voltage source electrically connected to said each of said plurality of conductive rods of said fourth rod set, said fourth voltage source applying an AC voltage to said fourth rod set such that a variable AC voltage is applied to two radially opposing conductive rods of said fourth rod set.

12. The mass spectrometer system according to claim 11, wherein each of said plurality of conductive rods of said third rod set is generally circular in cross-section.

13. The mass spectrometer system according to claim 11, wherein each of said plurality of conductive rods of said fourth rod set is generally T-shaped in cross-section.

14. The mass spectrometer system according to claim 10 further comprising said second voltage source supplying a constant RF voltage to a remainder of said plurality of conductive rods of said second rod set.

15. The mass spectrometer system according to claim 10, wherein each of said plurality of conductive rods of said first rod set is generally circular in cross-section.

16. The mass spectrometer system according to claim 10, wherein each of said plurality of conductive rods of said second rod set is generally T-shaped in cross-section.

17. A method of improving mass resolution of a mass filter, the method comprising:

providing a first plurality of elongated electrodes arranged equidistant around a central axis;

providing a second plurality of elongated electrodes substantially parallel to and interposed with said first plurality of elongated electrodes in an alternating pattern;

applying a voltage in response to an angular RF frequency and a ratio of an RF amplitude and a DC voltage magnitude to said first plurality of elongated electrodes; and applying a variable AC voltage to two radially opposing electrodes of said second plurality of elongated electrodes.

18. The method according to claim 17 further comprising applying at least one waveform to vary said voltage applied to said first plurality of elongated electrodes.

19. The method according to claim 17 further comprising applying at least one waveform to vary said variable AC voltage to said two radially opposing electrodes of said plurality of electrodes.

20. The method according to claim 17 further comprising applying a constant RF voltage to a remainder of said second plurality of elongated electrodes.

21. The method according to claim 17 further comprising applying said variable AC voltage to said two radially opposing complementary electrodes using a function of both a selected mass-to-charge ratio and a mass resolution.

22. The method according to claim 17 further comprising introducing a plurality of ions into the mass filter and separating said ions based on a mass-to-charge ratio.

23. The method according to claim 17 further comprising detecting said ions separated by said mass-to-charge ratio.

24. The method according to claim 17, wherein said variable AC voltage comprises a variable amplitude.

* * * * *